(12) United States Patent
Miyazaki

(10) Patent No.: US 11,677,495 B2
(45) Date of Patent: Jun. 13, 2023

(54) SAFETY COMMUNICATION DEVICE, SAFETY COMMUNICATION SYSTEM, SAFETY COMMUNICATION METHOD, AND COMPUTER READABLE MEDIUM

(71) Applicant: MITSUBISHI ELECTRIC CORPORATION, Tokyo (JP)

(72) Inventor: Kiyohito Miyazaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 53 days.

(21) Appl. No.: 17/407,560

(22) Filed: Aug. 20, 2021

(65) Prior Publication Data

US 2021/0385010 A1 Dec. 9, 2021

Related U.S. Application Data

(63) Continuation of application No. PCT/JP2019/016367, filed on Apr. 16, 2019.

(51) Int. Cl.
*H04L 1/00* (2006.01)
*H04L 1/20* (2006.01)

(52) U.S. Cl.
CPC ............ *H04L 1/0045* (2013.01); *H04L 1/203* (2013.01)

(58) Field of Classification Search
CPC .. G06F 11/0796; G06F 11/08; G06F 11/2247; G06F 11/3051; H04L 1/0045;
(Continued)

(56) References Cited

U.S. PATENT DOCUMENTS 6,530,055 B1 3/2003 Fukunaga
6,631,476 B1 10/2003 Vandesteeg et al.
(Continued)

FOREIGN PATENT DOCUMENTS

JP 8-163102 A 6/1996
JP 9-298575 A 11/1997
(Continued)

OTHER PUBLICATIONS

Preschern et al., Built-in security enhancement for the 1oo2 safety architecture, IEEE, International Conference on Cyber Technology in automation, control and intelligent systems, pp. 103-108. (Year: 2012).*

(Continued)

*Primary Examiner* — Shelly A Chase
(74) *Attorney, Agent, or Firm* — Birch, Stewart, Kolasch & Birch, LLP

(57) ABSTRACT

A safety communication device includes: a safety layer parameter acquisition part to acquire a reception bit rate of safety layer data being received per unit time; a threshold value setting part to set a request error rate requested as an upper limit of a bit error rate of the safety layer data received per unit time, on the basis of a request value corresponding to a bit error rate request being requested as an upper limit of an error occurrence probability per bit during data communication in a non-safety network, and a reception bit rate; and a safety monitoring control part to compare the bit error rate of the safety layer data received within a unit time, with the request error rate, and to perform safety control on the basis of a comparison result.

12 Claims, 12 Drawing Sheets

(58) Field of Classification Search
CPC ......... H04L 1/004; H04L 1/203; H04L 67/12;
G05B 19/418; G05B 19/41855
See application file for complete search history.

(56) References Cited

U.S. PATENT DOCUMENTS

| | | |
|---|---|---|
| 6,701,198 B1 | 3/2004 | Vandesteeg et al. |
| 6,721,900 B1 | 4/2004 | Lenner et al. |
| 6,891,850 B1 | 5/2005 | Vandesteeg et al. |
| 6,907,542 B2 | 6/2005 | Barthel |
| 2002/0010874 A1 | 1/2002 | Barthel |
| 2003/0145120 A1 | 7/2003 | Vasko et al. |
| 2003/0167394 A1 | 9/2003 | Suzuki et al. |
| 2003/0208283 A1 | 11/2003 | Vasko et al. |
| 2010/0146266 A1 | 6/2010 | Chen et al. |
| 2011/0302468 A1 | 12/2011 | Ikawa et al. |
| 2012/0272105 A1 | 10/2012 | Chen et al. |
| 2015/0058707 A1 | 2/2015 | Lee et al. |
| 2017/0094523 A1 | 3/2017 | Mazzarella et al. |
| 2017/0094524 A1 | 3/2017 | Mazzarella et al. |
| 2017/0366976 A1 | 12/2017 | Mazzarella et al. |
| 2020/0064819 A1* | 2/2020 | Fisher ............... H04L 67/12 |

FOREIGN PATENT DOCUMENTS

| | | |
|---|---|---|
| JP | 11-252205 A | 9/1999 |
| JP | 2000-307672 A | 11/2000 |
| JP | 2003-518356 A | 6/2003 |
| JP | 3819729 B2 | 9/2006 |
| JP | 2010-206394 A | 9/2010 |
| KR | 10-2011-0127693 A | 11/2011 |
| KR | 10-2013-0100762 A | 9/2013 |
| WO | WO 01/46765 A1 | 6/2001 |
| WO | WO 2010/097889 A1 | 9/2010 |

OTHER PUBLICATIONS

Akerberg et al., Efficient integration of secure and safety critical industrial wireless sensor network, EURASIO Journal on wireless communication and networking, pp. 1 to 13. (Year: 2011).*
Creech, Black channel communication, what it is and how does it work? ICS Triplex Technology, Ltd, pp. 304 to 309 (retrieved from Google.com). (Year: 2007).*
Indian Office Action for Indian Application No. 202147046016, dated Mar. 10, 2022, with English translation.
Korean Office Action for Korean Application No. 10-2021-7031437, dated Feb. 22, 2022, with English translation.
LV el al., "A Sieving Method for the Optimization of Embedded CRC Codes," 2012 International Conference on Information Science and Technology, IEEE, Wuhan, Hubei, China, Mar. 23-25, 2012, pp. 560-566 (7 pages total).
International Search Report, issued in PCT/JP2019/016367, PCT/ISA/210, dated Jul. 2, 2019.
Schiller et al., "Analysis of Nested CRC with Additional Net Data by Means of Stochastic Automata for Safety-critical Communication", 2008, total 10 pages.
German Office Action for German Application No. 11 2019 007 018.5 dated Sep. 6, 2022, with English Translation.

* cited by examiner

Fig. 3

| SAFETY PDU RECEIVED BY SAFETY LAYER (100%) | CLASSIFICATION | CHECK RESULT SAFETY LAYER |
|---|---|---|
| | ERROR FREE (99%) | (CORRECT SAFETY PDU) |
| | ERROR INCLUDED (1%) | DETECTED (0.999%) |
| | | UNDETECTED (0.001%) |

Fig. 4

| CLASSIFICATION | CHECK RESULT | | |
|---|---|---|---|
| | NON-SAFETY LAYER | SAFETY LAYER | |
| SAFETY PDU RECEIVED BY NON-SAFETY LAYER (100%) | ERROR FREE (99%) | (CORRECT SAFETY PDU) | |
| | ERROR INCLUDED (1%) | DETECTED (0.99%) | (PDU NOT REACHING SAFETY LAYER) |
| | | UNDETECTED (0.01%) | DETECTED (0.0099%) |
| | | | UNDETECTED (0.0001%) |

Fig. 9

| GENERALIZED SYMBOL | PERTINENT SIGN | DEFINITION |
|---|---|---|
| X | P | PROBABILITY PER UNIT OF PDU |
|  | R | RATE PER HOUR (ABOVE P MULTIPLIED BY SAFETY PDU RATE v PER HOUR) |
| Y | (WITHOUT PRIME) | INDICATES THAT NUMERICAL VALUE EXPRESSED BY X IS ACTUAL MEASUREMENT VALUE |
|  | ' (WITH PRIME) | INDICATES THAT NUMERICAL VALUE EXPRESSED BY X IS REQUEST VALUE |
| Z | ef | REPRESENTS EVENT IN WHICH SAFETY PDU IS ERROR FREE |
|  | de | REPRESENTS EVENT IN WHICH DETECTABLE ERROR EXISTS IN SAFETY PDU |
|  | re | REPRESENTS EVENT IN WHICH UNDETECTABLE ERROR EXISTS IN SAFETY PDU |
|  | BC | INDICATES THAT EVENT Z IS OBSERVED IN NON-SAFETY LAYER |
| U | SCL | INDICATES THAT EVENT Z IS OBSERVED IN SAFETY LAYER, ASSUMING THAT NO BLACK CHANNEL EXISTS BELOW SAFETY LAYER |
|  | SCL\|BC | INDICATES THAT EVENT Z IS OBSERVED IN SAFETY LAYER, ASSUMING THAT CORRECTLY OPERATING BLACK CHANNEL EXISTS BELOW SAFETY LAYER |

Fig. 10

| SYMBOL | DEFINITION |
|---|---|
| $P_e$ | ACTUAL MEASUREMENT VALUE OF BIT ERROR RATE OF BLACK CHANNEL. IF ' (PRIME) IS ATTACHED, REQUEST VALUE OF ACTUAL MEASUREMENT VALUE. |
| $n_1$ | BIT LENGTH OF SAFETY PDU |
| $n_2$ | BIT LENGTH OF PDU OF BLACK CHANNEL THAT INCLUDES SAFETY PDU |
| $hd_1$ | MINIMUM HAMMING DISTANCE OF CRC OF SAFETY LAYER |
| $hd_2$ | MINIMUM HAMMING DISTANCE OF CRC OF NON-SAFETY LAYER |
| $A_i$ | DISTRIBUTION FACTOR OF CRC OF NON-SAFETY LAYER |
| $A_i'$ | DISTRIBUTION FACTOR OF CRC OF SAFETY LAYER AFTER CHECKING BY CRC IN NON-SAFETY LAYER |
| $v$ | SAFETY PDU RATE RECEIVED BY SAFETY LAYER PER HOUR |

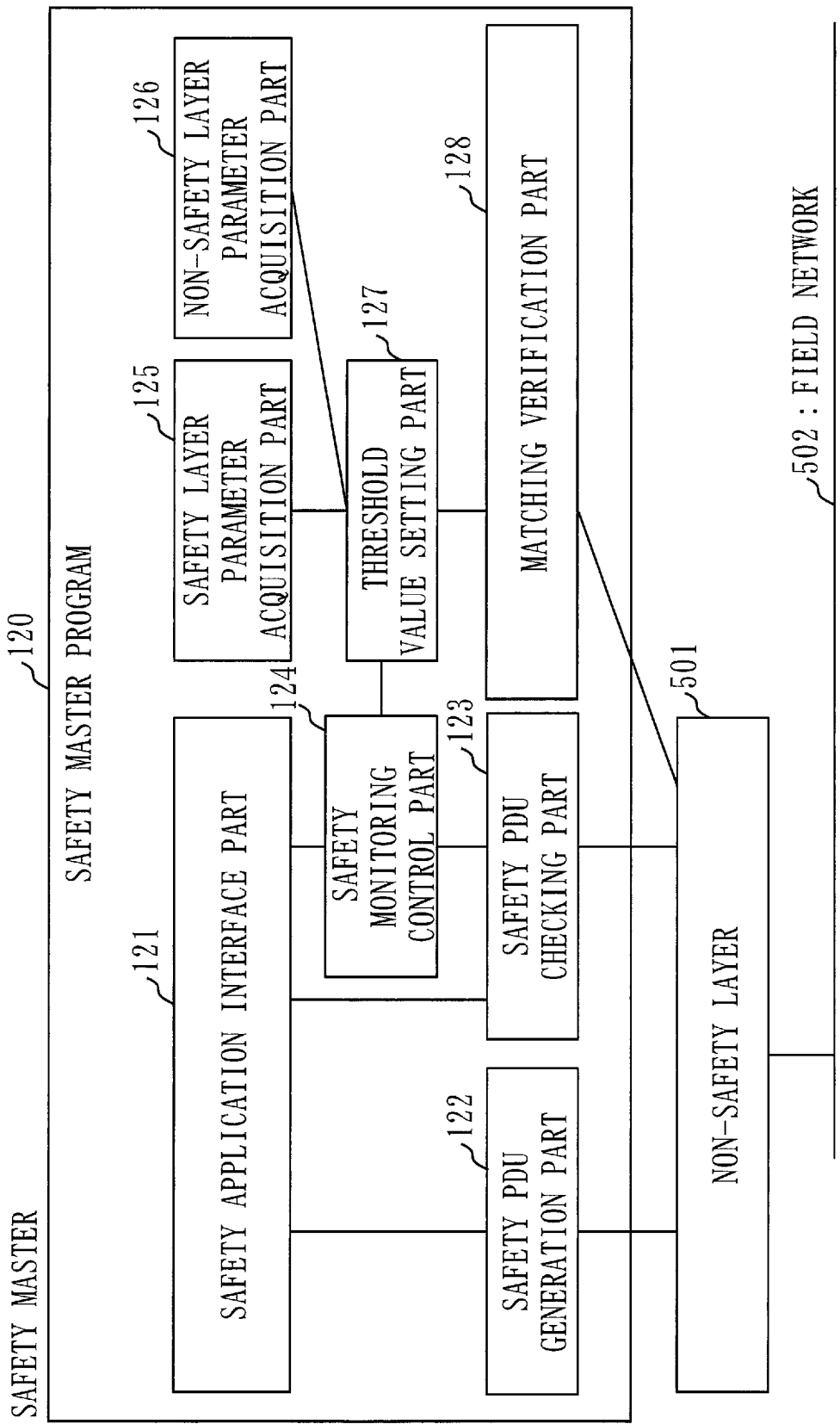

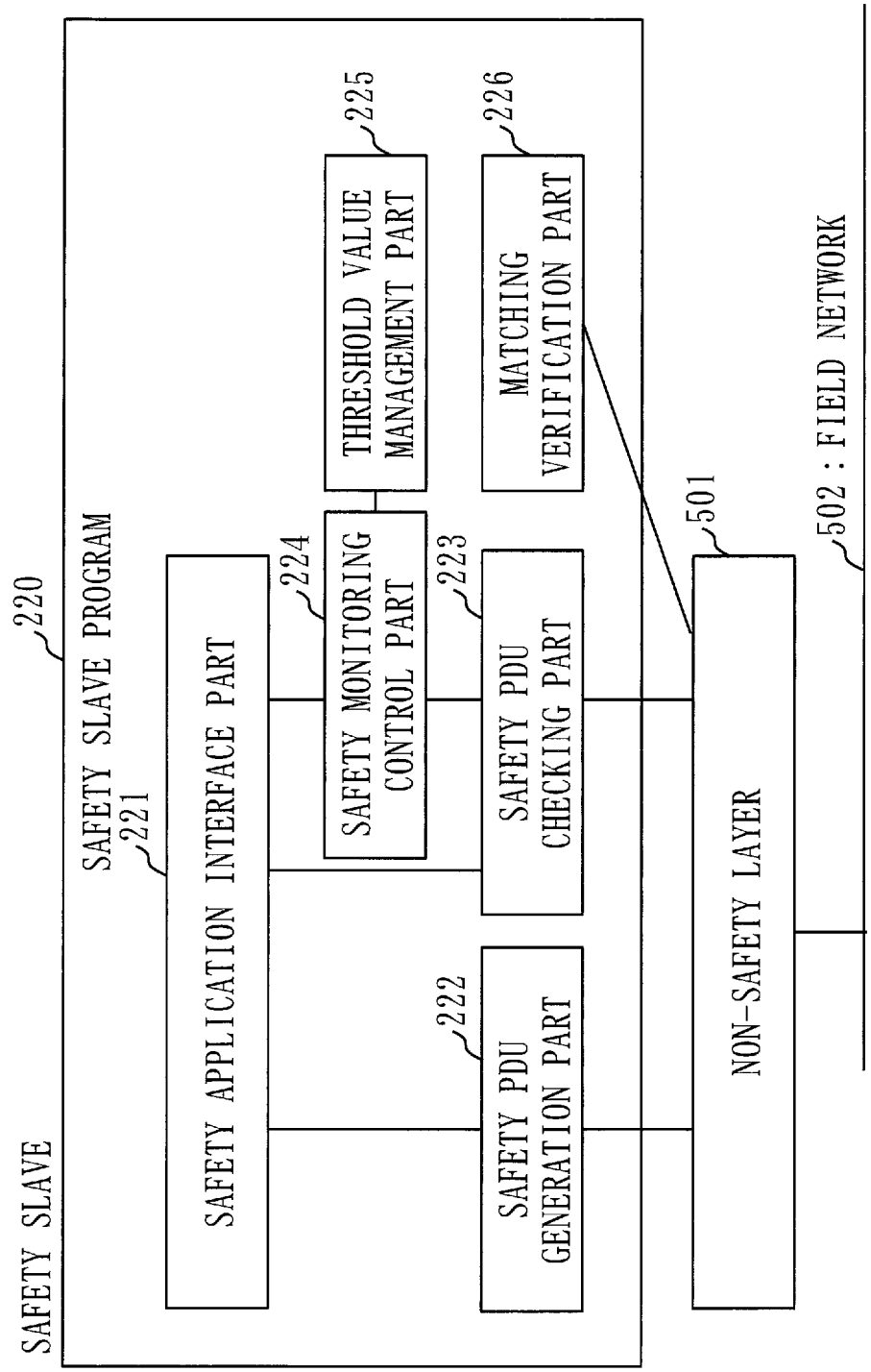

US 11,677,495 B2

SAFETY COMMUNICATION DEVICE, SAFETY COMMUNICATION SYSTEM, SAFETY COMMUNICATION METHOD, AND COMPUTER READABLE MEDIUM

CROSS REFERENCE TO RELATED APPLICATIONS

This application is a Continuation of PCT International Application No. PCT/JP2019/016367 filed on Apr. 16, 2019, which is hereby expressly incorporated by reference into the present application.

TECHNICAL FIELD

The present invention relates to a safety communication device, a safety communication system, a safety communication method, and a safety communication program.

BACKGROUND ART

Patent Literature 1 discloses a technique concerning a system that realizes safety communication by associating a default residual error rate with a threshold value of a bit error rate (bit error rate request value), so that the default error rate is achieved.

According to the system of the background art, a fail-safe operation is started when the bit error rate exceeds the threshold value designated by a parameter.

CITATION LIST

Patent Literature

Patent Literature 1: U.S. Pat. No. 6,907,542

SUMMARY OF INVENTION

Technical Problem

Assume a case where the background art is applied to communication which uses a black channel, being a network not guaranteed as meeting safety property such as a safety integrity level requested by standards or the like, and assume that a bit error is detected in the black channel and that a black channel Protocol Data Unit (PDU) having a bit error is to be discarded. In this case, if a fail-safe operation is performed when an error detection number of times in the safety PDU exceeds a threshold value, it cannot be guaranteed that the bit error rate of the black channel satisfies a request value, which is a problem.

It is an objective of the present invention to determine, in communication which uses a network not guaranteed as meeting safety property concerning data communication, such as a safety integrity level requested by standards or the like, whether or not the network satisfies the safety property concerning the data communication, and to perform safety control when the network does not satisfy the safety property concerning the data communication.

Solution to Problem

A safety communication device according to the present invention has a safety layer to receive safety layer data from a non-safety layer that performs non-safety layer error detection of detecting a bit error included in non-safety layer data transmitted via a non-safety network which is not guaranteed as meeting safety property of data communication and which includes the non-safety layer, the non-safety layer converting the non-safety layer data into the safety layer data and forwarding the safety layer data to the safety layer when a bit error is not detected in the non-safety layer data, the safety communication device comprising
a safety protocol data unit checking part to perform safety layer error detection of detecting a bit error included in the safety layer data,
a safety layer parameter acquisition part to acquire a reception bit rate of the safety layer data being received per unit time, and a safety layer error detection characteristic which is information concerning a characteristic of the safety layer error detection,
a non-safety layer parameter acquisition part to acquire a non-safety layer error detection characteristic which is information concerning a characteristic of the non-safety layer error detection,
a threshold value setting part to set a request error rate requested as an upper limit of a unit-time error detection number being a number of bit errors detected by the safety protocol detection unit checking part and included in the safety layer data which is received per unit time, on a basis of: a request value corresponding to a bit error rate being requested as an upper limit of an error occurrence probability per bit during data communication in the non-safety network; the reception bit rate; the safety layer error detection characteristic; and the non-safety layer error detection characteristic, and
a safety monitoring control part to compare the unit-time error detection number with the request error rate, and to perform safety control on a basis of a comparison result.

Advantageous Effects of Invention

According to a safety communication device of the present invention, in communication which uses a non-safety network not guaranteed as meeting safety property concerning data communication, it is possible to set a request error rate requested as an upper limit of a unit-time error detection number being a number of bit errors included in safety layer data received per unit time, on the basis of a request value corresponding to a bit error rate requested as an upper limit of an error occurrence probability per bit during data communication in the non-safety network, and a reception bit rate of the safety layer data received per unit time by the safety communication device; to compare the unit-time error detection number with the request error rate; and to perform safety control on the basis of a comparison result.

BRIEF DESCRIPTION OF DRAWINGS

FIG. 3 is a table illustrating a virtual example of a safety PDU detection rate in a safety layer.
FIG. 4 is a table illustrating a virtual example of a safety PDU detection rate in a safety layer and a non-safety layer.

FIG. 9 is a table illustrating symbol definitions.

FIG. 10 is a table illustrating symbol definitions.

FIG. 11 is a software configuration diagram of a safety master program 120 according to Embodiment 2.

FIG. 12 is a software configuration diagram of a safety slave program 220 according to Embodiment 2.

DESCRIPTION OF EMBODIMENTS

Embodiment 1

The present embodiment will be described below in detail with referring to drawings.

Description of Background

International Electrotechnical Commission (IEC) 61784-3, being international standard prescribing requirements concerning a functional safety of a field bus, requests that safety communication take countermeasures against a communication error such as a data error, so that a residual error rate is less than a reference value fixed per Safety Integrity Level (SIL). An error signifies that data includes a bit error. A rate is a value related to communication data and signifies an accumulative value per unit time. A data error refers to an error of the communication data, or refers to a Protocol Data Unit (PDU) including a bit error.

Figure 1:
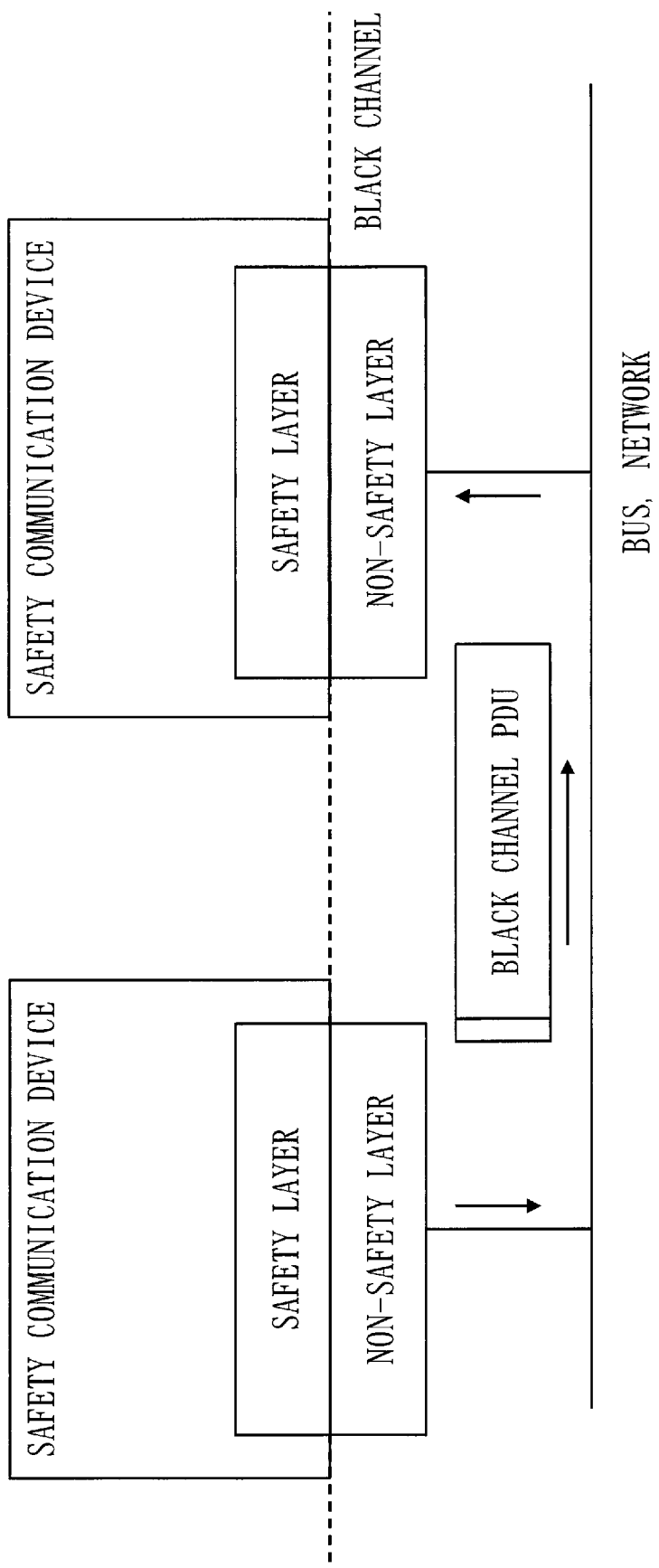
FIG. 1 is a schematic diagram of safety communication.

FIG. 1 is a schematic diagram of safety communication.

Safety communication is communication that is conducted by a safety layer and a black channel which is a network not guaranteed as meeting safety property such as a safety integrity level requested by standards or the like, as illustrated in FIG. 1.

A safety layer is a layer that performs communication processing, such as a terminal which transmits and receives data.

A safety communication device has a safety layer. The safety communication device may communicate with a terminal or the like other than a safety communication device.

A black channel is a communication layer for general communication, which is located below the safety layer and is formed of a non-safety layer and a bus, a network, or the like.

For the sake of convenience, a layer which is an interface portion between the safety layer and the black channel and located on a black channel side to perform communication error check will be called non-safety layer.

When functions concerning communication are classified, each layer corresponds to software or hardware that implements a classified function.

Safety communication may employ a master/slave scheme. When the master/slave scheme is employed, a safety master side and a safety slave side are endpoints.

When a safety PDU is transmitted from the safety layer to the black channel, a black channel PDU is forwarded in the black channel.

One-unit data which the safety layer transmits to the black channel is called a safety PDU. One-unit data which the non-safety layer transmits to the black channel is called a black channel PDU.

Figure 2:
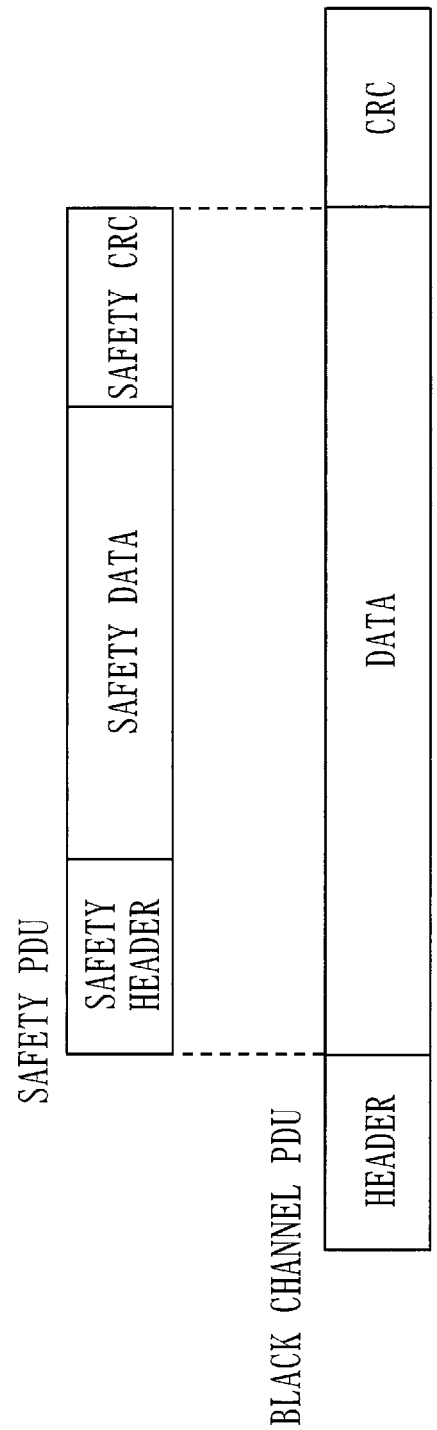
FIG. 2 is a schematic diagram of a safety PDU and a black channel PDU.

FIG. 2 is a diagram illustrating a relationship between the safety PDU and the black channel PDU.

As illustrated in FIG. 2, the safety PDU is encapsulated in the black channel PDU.

The safety PDU and black channel PDU illustrated in FIG. 2 are checked by CRC. However, the safety PDU and black channel PDU need not be checked by CRC. In that case, the safety PDU and black channel PDU do not have check data for CRC. A safety header is a header of the safety PDU. A safety CRC is checking data for checking the safety PDU.

The safety layer, when transmitting data, generates a safety PDU by adding protective information such as check data for Cyclic Redundancy Check (CRC) to the data, so as to detect a communication error, and when receiving the data, detects the communication error by utilizing the protective information of the safety PDU.

The non-safety layer generates a black channel PDU by adding protective information such as check data for Cyclic Redundancy Check (CRC) to the safety PDU, so as to detect the communication error when the safety layer transmits the data, and detects the communication error, when the safety layer receives data, by utilizing the protective information of the black channel PDU.

In designing safety communication, according to a specific example, there is a need for guaranteeing a bit error rate in a black channel to be used for safety communication, as satisfying a request such as being less than $10^{-4}$, so that safety is ensured. A bit error rate is one of parameters that influence the residual error rate. Therefore, when a low bit error rate is guaranteed, a low residual error rate is guaranteed.

A bit error rate is an error probability per bit based on a Binary Symmetric Channel model. In this model, a probability that a bit error occurs is equal among all bits, regardless of the bit value.

To cope with this need, according to a background art, a technique is disclosed that starts a fail-safe operation of minimizing an error when a measurement value concerning data error exceeds a threshold value during safety communication. It is suggested to use a number of data error detection times as the measurement value. The measurement value concerning a data error signifies a measurable value related to the data error.

In the following, a value merely described as a threshold value refers to a threshold value concerning transition to a safe state. A safe state is a state where the safety communication device performs a safety-considered operation such as a fail-safe operation.

A black channel used in safety communication is, in many cases, a field network that performs checking of whether or not a data error exists in a non-safety layer and discarding of an error-detected packet, and uses an Ethernet (registered trademark), a serial bus, or the like. In such a case, many of safety PDUs including a bit error are discarded before they are delivered to the safety layer. Accordingly, the number of data error detection times in the safety layer becomes smaller than it actually is.

Therefore, in a case where the safety layer adopts the background art, when the bit error rate exceeds an upper limit value of the request, sometimes the number of data error detection times in the safety layer does not exceed the threshold value. This leads to a risk that a fail-safe operation may not be started.

That is, in a case where the black channel has an error detection function, the background art cannot guarantee the bit error rate as satisfying the request.

As a countermeasure to cope with this problem, the threshold value may be set on the basis of the number of data error detection times in the black channel, instead of in the safety layer. In general, however, different from a safety layer, a black channel is not fail-safe designed. Thus, a measurement value in the black channel is not always reliable.

According to another countermeasure, the number of data error detection times including detection of a data error in the black channel may be found from a difference between a number of safety PDUs transmitted by the safety layer and a number of safety PDUs which are received by the safety layer and in which no data error was detected.

With this countermeasure, the reliability concerning the measurement value in the black channel does not pose a problem.

However, since not only a data error but also a safety PDU that is lost in the black channel is also included when counting the number of detection times, a fail-safe operation occurs excessively, leading to a problem of a lower system availability.

From the above, with the background art alone, when safety communication is performed with using a black channel having an error detection function, the bit error rate cannot be guaranteed as satisfying the request.

In view of this, when the black channel has an error detection function, it is necessary to set an appropriate threshold value that guarantees the bit error rate as satisfying the request, on the basis of the number of data error detection times in the safety layer.

Description of Solution

According to a solution, a method is available that is common with the background art in that transition to a safe state occurs when a measurement value concerning a data error in the safety layer exceeds the threshold value. However, in the solution method, the threshold value for transition to the safe state is set to an appropriate value in accordance with an error detection function in the black channel, by using a parameter concerning the error detection function in the black channel, in addition to a parameter concerning an error detection function in the safety layer.

For comparison, description will be made on threshold value setting in which the background art is applied unchanged to the safety layer. The background art suggests a method of finding a safety PDU detection rate that matches a request value corresponding to the bit error rate, on the basis of a length of the safety PDU and a CRC polynomial of the safety layer.

A detection rate refers to a proportion of safety PDUs including a bit error in which a data error is detected, to all PDUs including a bit error. A non-detection rate is a proportion of safety PDUs including a bit error in which a data error is not detected, to all safety PDUs including a bit error.

The request value corresponding to the bit error rate, when the bit error rate or the like is requested to be equal to or less than a certain value, refers to that certain value, and when the bit error or the like is requested to be less than a certain value, refers to that certain value.

In the following, a value calculated on the basis of the request value corresponding to the bit error rate will be expressed using a term a "request value".

FIG. 3 is a table illustrating virtual examples of a safety PDU detection rate.

In a classification column of FIG. 3, a figure expressed in percentage to follow "error included" and a figure expressed in percentage to follow "error free" refer to a probability that the safety PDU does not include a bit error and a probability that the safety PDU includes a bit error, respectively, each being found from a bit error rate. In a specific example, one safety PDU has a size of 100 bits.

In a check result column of FIG. 3, a figure expressed in percentage to follow "detected" and a figure expressed in percentage to follow "undetected" refer to a detection rate and a non-detection rate, respectively, in the safety layer.

According to this example, in the safety layer to which the background art is applied unchanged, 0.999% of a total number of safety PDUs is detected as data error, and accordingly the threshold value is determined on the basis of 0.999%. When a measurement value concerning data error exceeds this threshold value, it is supposed that the bit error rate does not satisfy the request. Hence, the safety communication device starts a fail-safe operation.

A method of setting a threshold value when the solution is applied will be described.

According to the solution, a detection rate, which is finally delivered to the safety layer and which matches a request value corresponding to the bit error rate, of a safety PDU in a safety layer is found with taking error detection in the black channel into consideration, and the threshold value is set.

FIG. 4 is a table illustrating virtual examples of a safety PDU detection rate.

In a non-safety layer column within a check result column of FIG. 4, a figure expressed in percentage to follow "detected" and a figure expressed in percentage to follow "undetected" refer to a detection rate and a non-detection rate, respectively, in the non-safety layer.

According to this example, in the non-safety layer, 99% of the whole safety PDUs (0.99% of all) including a bit error is detected and discarded, and 1% of the whole safety PDUs (0.01% of all) including a bit error is delivered to the safety layer. A detection rate in the safety layer is 0.0099% instead of 0.999% of the original example. According to this solution, the threshold value is set on the basis of 0.0099%.

In the above example, the detection rate in the non-safety layer and the detection rate in the safety layer are illustrated in a simplified manner. In practice, a mathematical relationship as follows exists between the detection rate in the non-safety layer and the detection rate in the safety layer. How to find a data error detection rate in the safety layer finally will be described later.

The detection rate in the non-safety layer and the detection rate in the safety layer are decided by parameters such as a length of the PDU and a polynomial to be used. Hence, when these parameters change, the detection rates change.

The detection rate in the safety layer changes not only by the parameters in the safety layer but also by the parameters in the non-safety layer. That is, the detection rate in the safety layer is not a simple product of the non-detection rate in the non-safety layer and the detection rate in the safety layer as a single element.

Description of Configurations

Figure 5:
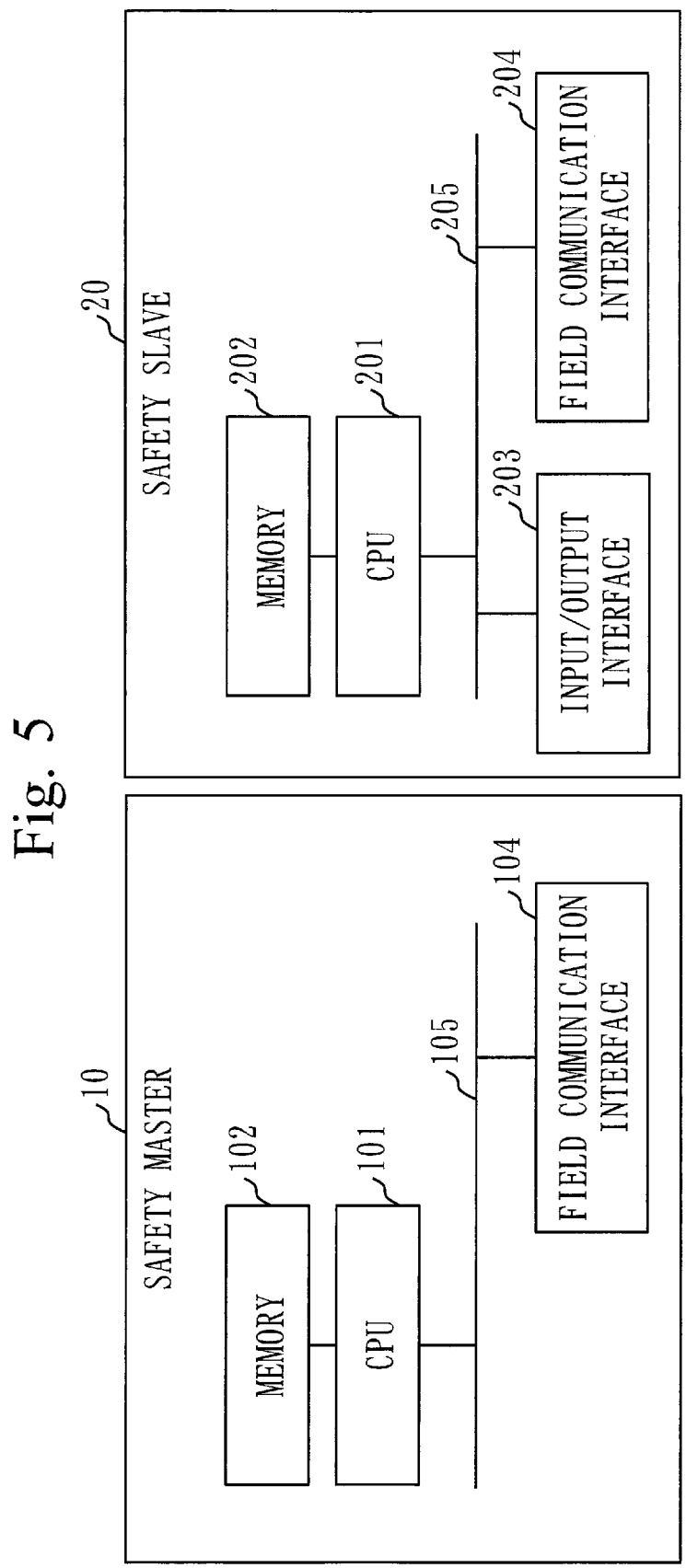
FIG. 5 is a hardware configuration diagram of a safety communication device according to Embodiment 1.

FIG. 5 is a hardware configuration diagram of the safety communication device according to the present embodiment.

As illustrated in FIG. 5, the safety communication device is constituted of a general-purpose computer.

A safety communication system by the master/slave scheme need not be necessarily realized with using the safety communication device according to the present embodiment. However, a case will be described for the sake of descriptive convenience, where a safety communication system by the master/slave scheme is realized with using the safety communication device according to the present embodiment.

Note that the term "safety communication device" is also a generic term referring to a safety master 10 and a safety slave 20.

The safety communication system according to the present embodiment is constituted of one or more safety masters 10 and one or more safety slaves 20. One safety master 10 out of the one or more safety masters 10 and one safety slave 20 out of the one or more safety slaves 20 create a one-to-one safety connection (a theoretical connection used for safety communication) and perform safety communication.

The safety master 10 and the safety slave 20 are connected to each other via a field network 502, and perform communication via the field network 502.

In a case where a safety communication system by the master/slave scheme is not realized with using the safety communication device of the present embodiment, operations and configurations of the safety communication device are the same as those of the safety master 10 except for a portion concerning a linkage with the safety slave 20.

The safety master 10 is provided with a Central Processing Unit (CPU) 101, a memory 102, a field communication interface 104, and a bus 105 which connects them. The CPU 101 runs a safety communication program which is software developed on the memory 102, thereby performing safety communication with the counter safety slave 20 via the field communication interface 104.

A function of the safety layer is implemented by the safety communication program.

The CPU 101 is connected to the other hardware devices via the bus 105 (signal line) and controls the other hardware devices.

The CPU 101 is a processing device that runs a safety master program 120, an Operating System (OS), and so on. The processing device is sometimes called an Integrated Circuit (IC) as well. Specific examples of the CPU 101 include a CPU, a Digital Signal Processor (DSP), and a Graphics Processing Unit (GPU). The CPU 101 reads the program stored in the memory 102 and runs the program.

The safety master 10 of FIG. 5 is provided with only one CPU 101. However, the safety master 10 and the safety slave 20 may be each provided with a plurality of processors that replace the CPU. The plurality of processors share running of the safety communication program, and the like.

The memory 102 is a storage device that stores data temporarily, and functions as a main memory used as a working area of the CPU 101. Specific examples of the memory 102 include a Random-Access Memory (RAM) such as a Static Random-Access Memory (SRAM) and a Dynamic Random-Access Memory (DRAM). The memory 102 keeps a computation result of the CPU 101.

Although not illustrated in FIG. 5, the safety master 10 and the safety slave 20 may be each provided with a storage device. The storage device is a storage device that keeps data in a non-volatile manner, and stores the OS, the safety communication program, and so on. Specific examples of the storage device include a Hard Disk Drive (HDD) and a Solid-State Drive (SSD). Alternatively, the storage device may be a portable recording medium such as a memory card, a Secure Digital (SD; registered trademark) memory card, a Compact Flash (CF), a NAND flash, a flexible disk, an optical disk, a compact disk, a Blu-ray (registered trademark) Disc, and a Digital Versatile Disk (DVD).

The safety slave 20 may be provided with a CPU 201, a memory 202, a field communication interface 204, and a bus 205, just as the safety master 10 is, and may be provided with an input/output interface 203 to perform device control.

Operations of the safety slave 20 are similar to operations of the safety master 10. The safety slave 20 performs safety communication with the counter safety master 10 via the field communication interface 204.

Figure 6:
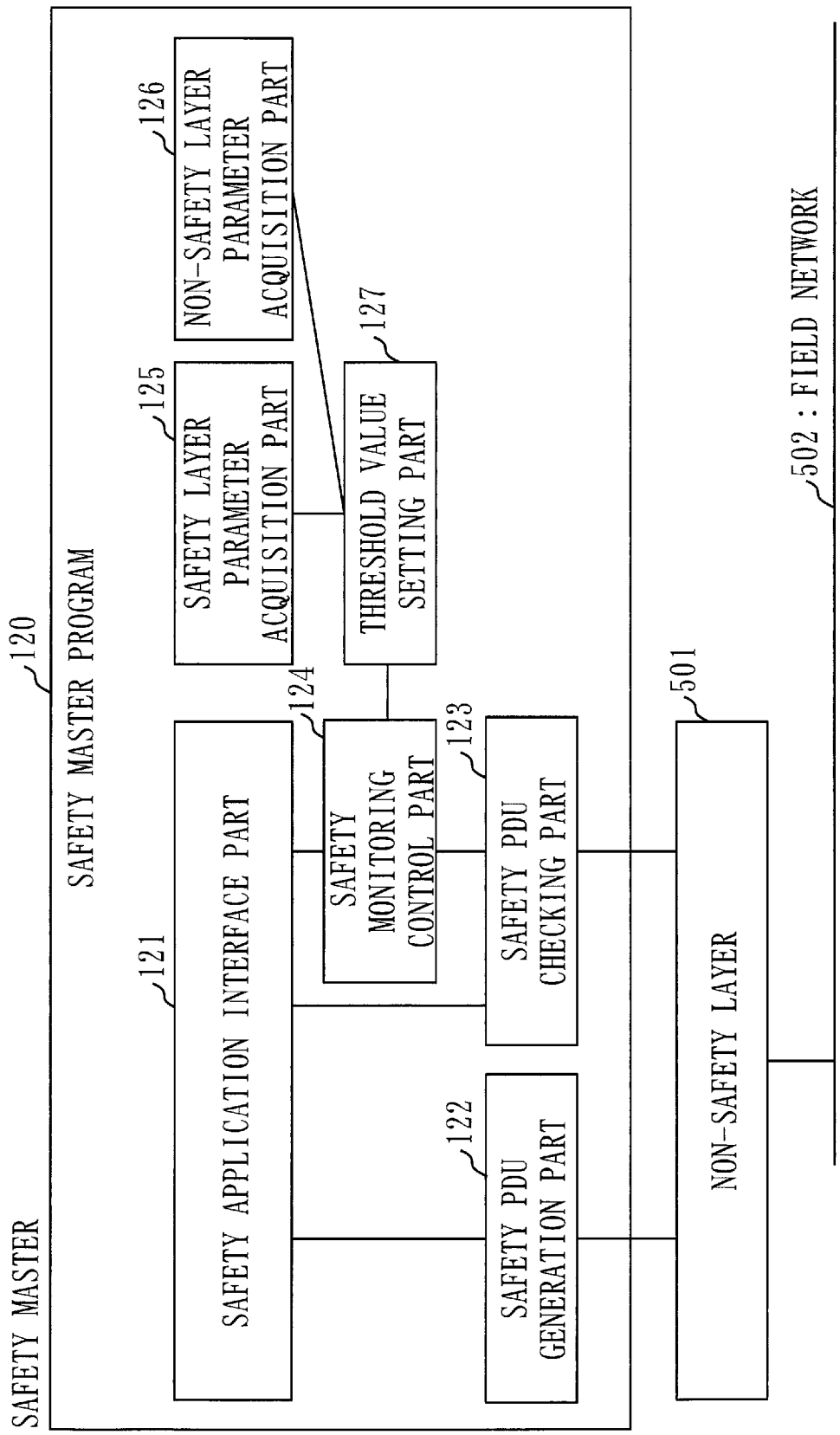
FIG. 6 is a software configuration diagram of a safety master program 120 according to Embodiment 1.

FIG. 6 is a software configuration diagram of the safety master program 120 according to the present embodiment.

The safety master program 120 will be described with referring to FIG. 6. The safety master program 120 runs in the safety master 10.

Note that the term "safety communication program" is also a generic term referring to the safety master program 120 and the safety slave program 220. The safety communication program may be an independent program. Alternatively, functions of the safety communication program may be incorporated in the OS or the like partly or entirely.

In a specific example, the safety communication program uses CRC for checking communication data. The safety communication program may check the communication data by another method.

A safety layer of the safety master 10 is a communication application that runs above a black channel constituted of a non-safety layer 501 and a field network 502.

The black channel is a general communication channel such as an Ethernet-based field network and a field bus which uses a serial bus. A configuration of the black channel is not particularly limited.

A safety application interface part 121 delivers safety data which a safety application running in the safety master 10 communicates with the safety slave 20, to the safety application and the safety master program 120.

A safety PDU generation part 122
generates a safety PDU by adding CRC check data, protective information of a safety header, and the like to the safety data whose transmission is requested by the safety application, and
transmits the generated safety PDU via a non-safety layer 501.

A safety PDU checking part 123
receives the safety PDU which the safety master 10 receives, via the non-safety layer 501,
checks the CRC check data, the protective information included in the safety header, and so on which are included in the received safety PDU, and
when an error is not detected in the received safety PDU, transfers the received safety PDU to the safety application interface part 121.

The safety PDU checking part 123 performs safety layer error detection of detecting a bit error included in safety layer data.

The safety PDU checking part 123 stands for the safety protocol Data Unit checking part 123.

Non-safety layer data is data transmitted via a non-safety network which is not guaranteed as meeting data communication safety and which is provided with a non-safety layer.

The safety layer data is data which is converted from the non-safety layer data by the non-safety layer and which the non-safety layer forwards to the safety layer.

A safety layer parameter acquisition part 125 acquires a parameter necessary for threshold value setting and concerning the safety layer from, in a specific example, a parameter area or the like of the safety master 10.

The safety layer parameter acquisition part 125 may acquire a reception bit rate of the safety layer data being received per unit time, and a safety layer error detection characteristic which is information concerning a characteristic of safety layer error detection, and may acquire a safety layer data check parameter which is to be used for safety layer error detection.

The information concerning the characteristic of safety layer error detection is information having some relation with error detection of the safety layer detection.

A non-safety layer parameter acquisition part 126 acquires a parameter necessary for threshold value setting and concerning the non-safety layer from, in a specific example, the parameter area or the like of the safety master 10.

The non-safety layer parameter acquisition part 126 may acquire a non-safety layer error detection characteristic which is information concerning a characteristic of non-safety layer error detection, and may acquire a non-safety layer data check parameter which is to be used for non-safety layer error detection.

The information concerning the characteristic of non-safety layer error detection is information having some relation with error detection of the non-safety layer data.

A threshold value setting part 127 calculates a threshold value as a trigger of transition to a safe state, on the basis of the request value corresponding to the bit error rate and of the parameters acquired by the safety layer parameter acquisition part 125 and the non-safety layer parameter acquisition part 126, and sets a calculated threshold value to a safety monitoring control part 124.

The threshold value setting part 127 sets a request error rate requested as an upper limit of a unit-time error detection number being a number of bit errors detected by the safety PDU checking part 123 and included in the safety layer data which is received per unit time, on the basis of: a request value corresponding to a bit error rate being requested as an upper limit of an error occurrence probability per bit during data communication in a non-safety network; a reception bit rate; a safety layer error detection characteristic; and a non-safety layer error detection characteristic.

The safety monitoring control part 124 finds a measurement value concerning a data error from a result of checking which the safety PDU checking part 123 conducts on a received safety PDU, and when the measurement value concerning data error exceeds a threshold value being set by the threshold value setting part 127, instructs the safety application interface part 121 to perform transition to a safe state.

The safety monitoring control part 124 compares the unit-time error detection number being a number of bit errors included in the safety layer data received per unit time with the request error rate, and performs safety control on the basis of a comparison result.

The request error rate includes a value calculated on the basis of the bit error rate of the safety layer data received per unit time.

Figure 7:
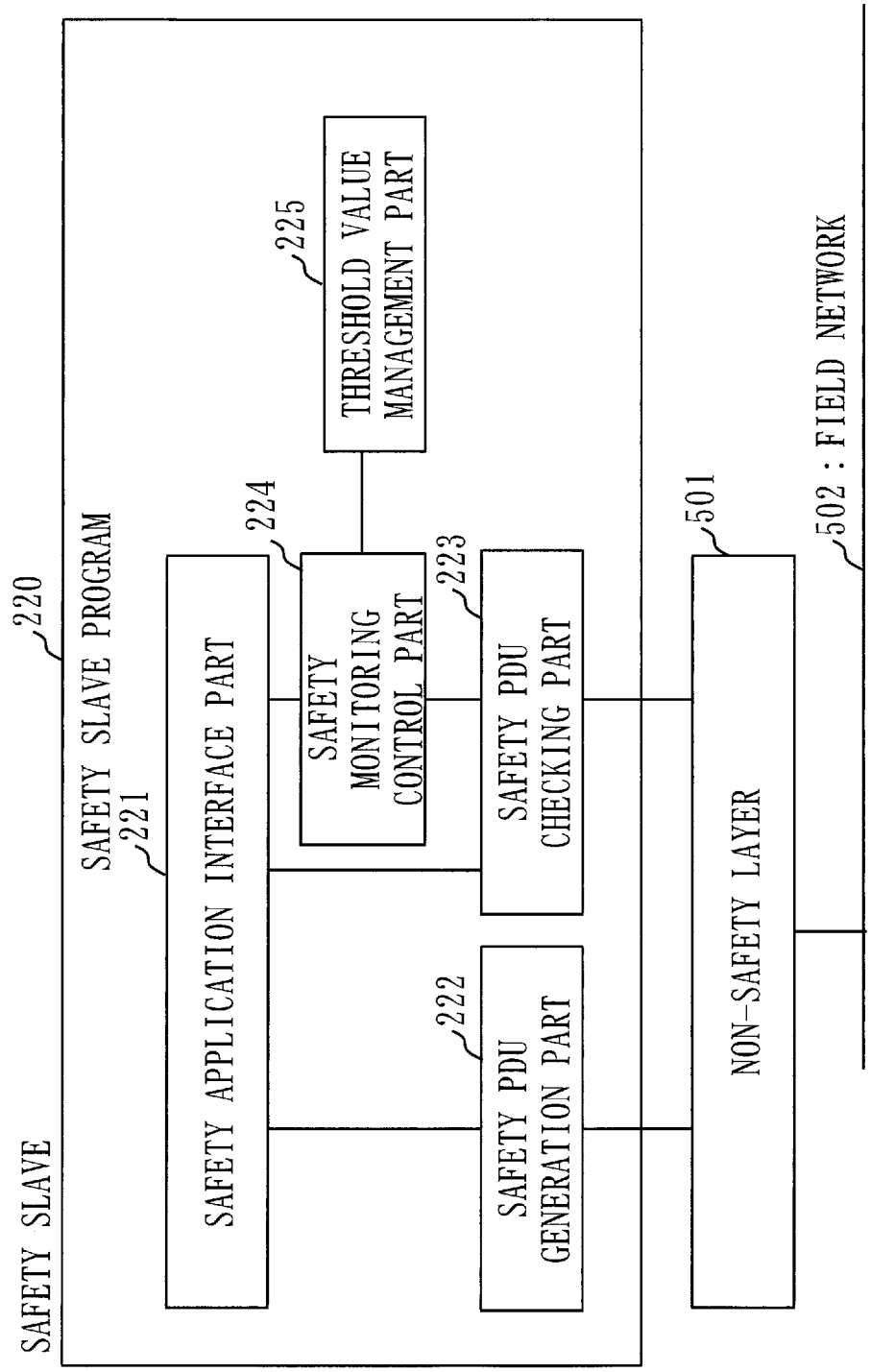
FIG. 7 is a software configuration diagram of a safety slave program 220 according to Embodiment 1.

FIG. 7 is a software configuration diagram of the safety slave program 220 according to the present embodiment.

The safety slave program 220 is a safety communication program that runs in the safety slave 20.

Parts that are denoted by reference signs 221 to 224 are the same as the parts denoted by reference signs 121 to 124, respectively.

A safety monitoring control part 224 confirms, on the basis of the threshold value generated by the threshold value setting part 127 of the safety master 10, that the measurement value concerning data error does not exceed the threshold value.

For this purpose, the e safety slave 20 is provided with a threshold value management part 225, instead of parts equivalent to the safety layer parameter acquisition part 125, the non-safety layer parameter acquisition part 126, and the threshold value setting part 127.

The threshold value management part 225 receives the threshold value from the threshold value setting part 127 of the safety master 10, and sets this threshold value to the safety monitoring control part 224.

A software configuration of each of the safety master program 120 and a software configuration of the safety slave program 220 is not limited to that described above.

In a specific example, since roles of the safety master 10 and roles of the safety slave 20 are different from those described above, the safety slave program 220 may be provided with a safety layer parameter acquisition part 125, a non-safety layer parameter acquisition part 126, and a threshold value setting part 127.

Description of Operations

Figure 8:
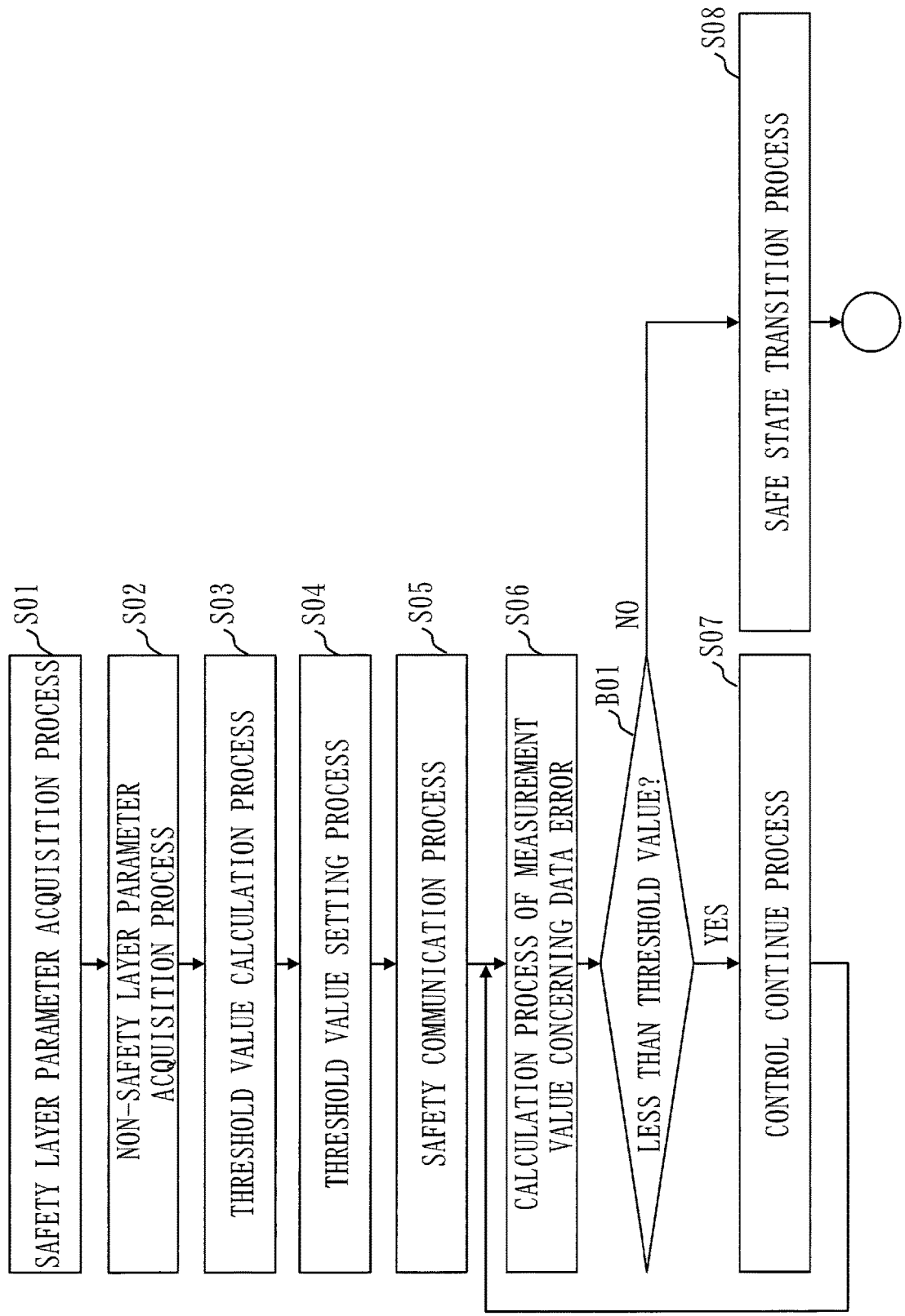
FIG. 8 is a flowchart illustrating operations of a safety master 10 according to Embodiment 1.

FIG. 8 is a flowchart illustrating a flow of processing concerning safety communication of the safety master 10. Steps S01 to S03 are processes conducted before safety control is started (during a process of setting up safety communication and establishing a safety connection). Step S04 and beyond are processes conducted after safety control is started.

Safety control is control that allows the safety communication device in operation to perform transition to a safe state.

An operation procedure of the safety communication device corresponds to a safety communication method. A program that realizes operations of the safety communication device corresponds to the safety communication program.

(Step S01: Safety Layer Parameter Acquisition Process)

The safety layer parameter acquisition part 125 acquires parameters including the following, which concern safety communication from the safety parameter area or the like of the safety master 10. Note that x in round parentheses of a polynomial represents a variable of the polynomial.

a generative polynomial $G_1(x)$ of CRC in the safety layer a bit length $n_1$ of the safety PDU a request value Pe' corresponding to the bit error rate of the black channel a safety PDU rate v received per hour in the safety layer The safety layer parameter acquisition part 125 need not necessarily acquire v.

(Step S02: Non-Safety Layer Parameter Acquisition Process)

The non-safety layer parameter acquisition part 126 acquires parameters including the following, which concern the non-safety layer from the safety parameter area or the like of the safety master 10.

a generative polynomial $G_2(x)$ of CRC in the non-safety layer a bit length $n_2(>n_1)$ of the black channel PDU (Step S03: Threshold Value Calculation Process)

The threshold value setting part 127 calculates the threshold value using the parameters acquired in steps S01 and S02. Threshold value calculation will be described in detail separately.

Alternatively, the threshold value may be a combination of measurement values concerning a plurality of data errors.

(Step S04: Threshold Value Setting Process)

The threshold value setting part 127 sets the threshold value calculated in step S03 to the safety monitoring control part 124.

(Step S05: Safety Communication Process)

The safety master program 120 establishes safety connection which is necessary to start safety communication (exchange of safety data) and starts safety communication.

(Step S06: Calculation Process of Measurement Value Concerning Data Error)

The safety PDU checking part 123 notifies the safety monitoring control part 124 of a check result of the received safety PDU.

The safety monitoring control part 124 finds measurement values including the following elements which concern a data error.

a number of data error detection cases in the safety layer
   a number of data-error-undetected safety PDUs received by the safety layer Desirably, the safety monitoring control part 124 finds measurement value concerning a data error in a time period determined by a nearest default time (for example, a unit time), and finds a measurement value concerning data error in a time period of the same length, to be associated with each other.

The safety monitoring control part 124 finds a measurement value concerning a data error successively.

(Branch B01)

The safety master 10, when the measurement value concerning a data error, which is found in step S06 exceeds the threshold value, executes a process of step S07, and when the measurement value concerning the data error does not exceed the threshold value, executes a process of step S08.

(Step S07: Control Continue Process)

The safety monitoring control part 124 determines that an actual measurement value Pe of the bit error rate of the black channel is less than Pe', and continues safety communication.

The safety master 10 performs transition to step S06.

(Step S08: Safe State Transition Process)

The safety monitoring control part 124 determines that Pe is equal to or more than Pe', and notifies the safety application interface part 121 of transition to the safe state.

Upon reception of the notice, the safety application interface part 121 disconnects the safety connection and notifies the safety application of transition to the safe state.

The safety connection is disconnected by the safety master 10, so that the safety slave 20 also performs transition to the safe state.

Processing in the safety slave 20 is the same as processing in the safety master 10 regarding operations by the safety monitoring control part 224 of: confirming whether or not a measurement value concerning data error exceeds a threshold value; and when the measurement value concerning data error exceeds the threshold value, of starting a fail-safe operation, and is different from processing in the safety master 10 in a respect that the processes of steps S01 to S03 are omitted and that threshold value setting of step S04 is performed by the threshold value management part 225.

Description of Operations of Step S03

Step S03 will now be described in detail.

FIG. 9 is a table illustrating interpretation of expression 1, definitions of symbols employed in a format of expression 1, and so on.

According to a specific example, $P'_{ef,BC}$ expresses a "request value corresponding to a probability, per unit of the safety PDU, that an event in which a safety PDU is error free is observed in a non-safety layer".

"Error Free" means that a PDU does not include a bit error. "Error included" means that a PDU includes a bit error.

FIG. 10 is a table that summarizes definitions of symbols employed hereinbelow.

$$X^Y_{Z,U} \qquad \text{[Expression 1]}$$

Step S03 consists of the following five steps. Expressions employed in the individual steps will now be presented to indicate that the present embodiment is feasible.

Concept of threshold value calculation will be explained briefly. The threshold value setting part 127 takes into consideration a request value corresponding to a bit error rate in the black channel, a proportion of error-detected safety PDUs in the non-safety layer, and a proportion of error-undetected safety PDUs in the safety layer, calculates a probability of error-detected safety PDU in the safety layer to a number of all safety PDUs reaching the non-safety layer, and calculates a threshold value with using this probability.

(Step S03-1)

As indicated by formula 1, the threshold value setting part 127 finds the request value (the request value corresponding to a probability, per unit of the safety PDU, that an event in which a safety PDU is error free is observed in a non-safety layer) $P'_{ef,BC}$ corresponding to an error-free probability of the non-safety layer.

$$P'_{ef,BC} = (1.0 - P'_e)^{n_2} \qquad \text{[Formula 1]}$$

(Step S03-2)

As indicated by formula 2, the threshold value setting part 127 finds a request value (a request value corresponding to a probability, per unit of the safety PDU, that an event in which a detectable error exists in the safety PDU is observed in a non-safety layer) $P'_{de,BC}$ corresponding to a detection error rate of the non-safety layer.

$$P'_{de,BC} = 1.0 - (P'_{ef,BC} + P'_{re,BC}) \qquad \text{[Expression 2]}$$

Note that $P'_{ef,BC}$ is found in step S03-1. $P'_{re,BC}$ is found as follows.

Note that $A_i$ is calculated in accordance with a polynomial of the non-safety layer, a bit length of the black channel PDU, and the like.

$$P'_{re,BC} = \sum_{i=hd_2}^{n_2} A_i \times P'^i_e \times (1 - P'_e)^{n_2 - i} \qquad \text{[Formula 2]}$$

(Step S03-3)

As indicated by formula 3, the threshold value setting part 127 finds a request value (a request value corresponding to a probability, per unit of the safety PDU, that an event in which an undetectable error exists in a safety PDU is observed in a safety layer, assuming that there is a correctly operating black channel below the safety layer) $P'_{re,SCL|BC}$ corresponding to a residual error rate of the safety layer.

Note that $P'_{re,SCL|BC}$ is, in both the non-safety layer and the safety layer, a proportion of the safety PDUs in which a data error is not detected, to the whole safety PDUs that reach the non-safety layer.

Note that $A_i'$ is calculated in accordance with the polynomial of the non-safety layer, a bit length of the black channel PDU, the polynomial of the safety layer, a bit length of the safety PDU, and so on. A specific scheme for calculating $P'_{re,SCL|BC}$ is described in Reference 1 and so on.

$$P'_{re,SCL|BC} = \sum_{i=1}^{n_2} A_i' \times P_e'^i \times (1 - P'_e)^{n_2-i} \quad \text{[Formula 3]}$$

REFERENCE 1

F. Schiller, "Analysis of Nested CRC with Additional Net Data by Means of Stochastic Automata for Safety-critical Communication", 2008.

(Step S03-4)

As indicated by formula 3, the threshold value setting part 127 finds a detection error rate (a request value corresponding to a probability, per unit of the safety PDU, that an event in which a detectable error exists in the safety PDU is observed in a safety layer, assuming that there is a correctly operating black channel below the safety layer) $P'_{de,SCL|BC}$ of the safety layer.

$$P'_{de,SCL|BC} = 1.0 - (P'_{ef,BC} + P'_{de,BC} + P'_{de,SCL|BC}) \quad \text{[Expression 3]}$$

(Step S03-5)

The threshold value setting part 127 sets the threshold value using $P'_{de,SCL|BC}$. According to a specific example, when a rate of detection errors per hour in the safety layer is to be used as a measurement value concerning data error, $R'_{de,SCL|BC}$ indicated below is determined as the threshold value.

$$R'_{de,SCL|BC} = P'_{de,SCL|BC} \times v \quad \text{[Expression 4]}$$

According to a specific example of the threshold value other than above, in a case where a ratio of a request value corresponding to an error-free probability of the non-safety layer to a detection error rate of the safety layer is used as a measurement value concerning data error, a ratio of $P'_{ef,BC}$ to $P'_{de,SCL|BC}$ may be used as the threshold value.

Comparison of the bit error rate and the request error rate includes not only direct comparison of the bit error rate and the request error rate, but also indirect comparison such as comparison of a value calculated with using the bit error rate and a value calculated with using the request error rate.

Each of a process of the above step S03-2 and a process of the above step S03-3 generally requires a large calculation amount. Therefore, as a specific example, $P'_{de,BC}$ and $P'_{re,SCL|BC}$ which are calculated in advance by a tool on a computer or a cloud may be used. Also, it is possible to use a threshold value which is calculated in advance and incorporated in a program by assuming a combination of a particular safety layer and a particular non-safety layer.

Characteristic of Embodiment 1

A safety communication device according to the present embodiment is a safety communication device having a safety layer to receive safety layer data from a non-safety layer 501 that performs non-safety layer error detection of detecting a bit error included in non-safety layer data transmitted via a non-safety network which is not guaranteed as meeting safety property of data communication and which includes the non-safety layer 501, the non-safety layer 501 converting the non-safety layer data into the safety layer data and forwarding the safety layer data to the safety layer when a bit error is not detected in the non-safety layer data, the safety communication device being provided with a safety PDU checking part 123 to perform safety layer error detection of detecting a bit error included in the safety layer data, a safety layer parameter acquisition part 125 to acquire a reception bit rate of the safety layer data being received per unit time, and a safety layer error detection characteristic which is information concerning a characteristic of the safety layer error detection, a non-safety layer parameter acquisition part 126 to acquire a non-safety layer error detection characteristic which is information concerning a characteristic of the non-safety layer error detection, a threshold value setting part 127 to set a request error rate requested as an upper limit of a unit-time error detection number being a number of bit errors detected by the safety PDU checking part 123 and included in the safety layer data which is received per unit time, on the basis of: a request value corresponding to a bit error rate being requested as an upper limit of an error occurrence probability per bit during data communication in the non-safety network; the reception bit rate; the safety layer error detection characteristic; and the non-safety layer error detection characteristic, and a safety monitoring control part 124 to compare the unit-time error detection number with the request error rate, and to perform safety control on the basis of a comparison result.

The safety layer parameter acquisition part 125 according to the present embodiment acquires a safety layer data check parameter which is to be used for safety layer error detection.

The non-safety layer parameter acquisition part 126 according to the present embodiment acquires a non-safety layer data check parameter which is to be used for the non-safety layer error detection.

The threshold value setting part 127 according to the present embodiment uses the non-safety layer data check parameter and the safety layer data check parameter when setting the request error rate.

In the safety communication device according to the present embodiment, when cyclic redundancy check is employed for checking the non-safety layer data and checking the safety layer data, the safety layer parameter acquisition part 125 acquires a unit length determined by a transmission unit of the safety layer data, and as the safety layer data check parameter, a parameter of a generative polynomial of cyclic redundancy check which is employed for checking the safety layer data, the non-safety layer parameter acquisition part 126 acquires a unit length of the non-safety layer data, and as the non-safety layer data check parameter, a parameter of a generative polynomial of cyclic redundancy check which is employed for checking the non-safety layer data, and the threshold value setting part 127 finds a request value corresponding to an error-free probability which is a probability that the non-safety layer data is error free, on the basis of the request value corresponding to the bit error rate and the unit length of the non-safety layer data, finds a request value corresponding to a detection error rate which is a proportion of a number of pieces of non-safety layer data detected as the non-safety layer data including a bit error, out of the non-safety layer data including a bit error in the non-safety layer, to a total number of pieces of non-safety layer data which is a total number of pieces of non-safety layer data that reach the non-safety layer, on the basis of the request value corresponding to the error-free probability, the request value corresponding to the bit error rate, the unit length of the non-safety layer data, and the non-safety layer data check parameter, finds a request value corresponding to a residual error rate which is a proportion of a number of pieces of safety layer data detected as safety layer data including a bit error, out of the safety layer data including a bit error in the safety layer, to a total number of pieces of non-safety layer data, on the basis of the request value corresponding to the bit error rate, the request value corresponding to the detection error rate, the unit length of the safety layer data, the safety layer data check parameter, the unit length of the non-safety layer data, and the non-safety layer data check parameter, and defines the request error rate as a value obtained by multiplying the request value corresponding to the residual error rate by the reception bit rate.

The safety communication system according to the present embodiment is provided with the safety communication device and the non-safety network.

Description of Effect of Embodiment 1

As described above, according to the safety communication device of Embodiment 1, in communication that uses a black channel, the threshold value setting part 127 sets a threshold value corresponding to the request value, on the basis of a request value corresponding to a bit error rate in the black channel, a parameter of a non-safety layer of the black channel, and a parameter of the safety layer, and when a safety PDU which the safety communication device receives does not satisfy the threshold value, it is determined that the request value is not satisfied, and transition to a safe state is performed.

<Modification 1>

In the present embodiment, a case has been described where individual functions of the safety communication device are implemented by software. However, according to a modification, the individual functions may be implemented by hardware.

When the individual functions are implemented by hardware, each of the safety master 10 and the safety slave 20 is provided with an electronic circuit (processing circuitry) in place of the CPU. Alternatively, each of the safety master 10 and the safety slave 20 is provided with an electronic circuit in place of the CPU and the memory. The electronic circuit is a dedicated electronic circuit that implements the individual functions (and the memory).

It is assumed that the electronic circuit is a single circuit, a composite circuit, a programmed processor, a parallel-programmed processor, a logic IC, a Gate Array (GA), an Application Specific Integrated Circuit (ASIC), or a Field-Programmable Gate Array (FPGA).

The individual functions may be implemented by one electronic circuit. The individual functions may be implemented by a plurality of electronic circuits through distribution.

Alternatively, some of the individual functions may be implemented by hardware, and the remaining ones of the individual functions may be implemented by software.

The CPU, the memory, and the electronic circuit mentioned above will be collectively referred to as "processing circuitry". That is, the individual functions are implemented by processing circuitry.

Embodiment 2

A difference from the embodiment described above will be described below with referring to drawings.

Description of Configurations

FIG. 11 is a software configuration diagram of a safety master 10 according to the present embodiment. FIG. 12 is a software configuration diagram of a safety slave 20 according to the present embodiment.

The safety master 10 according to the present embodiment is provided with a matching verification part 128, as illustrated in FIG. 11. The safety slave 20 according to the present embodiment is provided with a matching verification part 226, as illustrated in FIG. 12.

When a checking scheme concerning a data error and employed in a black channel has changed because, for example, a black channel apparatus of a safety communication system is exchanged after non-safety layer parameter acquisition, each of the matching verification part 128 and the matching verification part 226 detects the change in the checking scheme.

In such a case, if this change is not detected, the safety master 10 cannot guarantee safety because the premise for threshold value setting is lost. Therefore, in order to guarantee the safety, each of the matching verification part 128 and the matching verification part 226 confirms the parameter of the non-safety layer.

Description of Operations

A safety communication device according to the present embodiment executes a process of step S02-2 between step S02 and step S03. The process of step S02-2 is to verify whether or not a polynomial used in the non-safety layer agrees with the parameter of the non-safety layer.

(Step S02-1: Non-Safety Layer Parameter Acquisition Process)

This step is the same as step S02 mentioned above.

(Step S02-2: Matching Verification Process)

The matching verification part 128 generates a safety PDU (verification PDU) for checking, and transmits the safety PDU for checking toward a safety layer of the safety slave 20 via the non-safety layer 501.

Desirably, this verification PDU is clearly distinguishable from a PDU for safety control by a header or the like in order to guarantee that the verification PDU will not be used for safety control.

The matching verification part 226,
when receiving a verification PDU, determines that the parameter of the non-safety layer 501 and the parameter which the safety master 10 has as the parameter of the non-safety layer 501 match, because a non-safety layer 501 has not discarded the verification PDU, and
returns a response indicating "parameters do not match" to the safety master 10.

In this case, the safety master 10 and the safety slave 20 continue the operations of the safety communication system.

The matching verification part 226,
when not receiving a verification PDU, determines that the parameter in the non-safety layer 501 and the parameter which the safety master 10 has as the parameter of the non-safety layer 501 do not match, and
returns a response indicating "parameters do not match" to the safety master 10.

In this case, the safety master 10 and the safety slave 20 suspend activation of the safety communication system.

At this time, the safety master 10 and the safety slave 20 may notify the user of mismatching of the black channel.

In the verification PDU, according to a specific example, a payload portion of the safety PDU to which CRC check data has been appropriately attached is replaced by an exclusive OR (XOR) of the payload portion and a bit corresponding to following expression 6. Note that $G_2(x)$ must satisfy expression 6.

This verification PDU has a characteristic that
in the non-safety layer, no error is detected by checking based on CRC, and
in the safety layer, an error is detected by checking based on CRC.

$$G_2(x)x^j \qquad \text{[Expression 5]}$$

(Order of $G_2(x))+j<$(Bit length of payload of safety PDU) [Expression 6]

Desirably, in the safety communication system, a plurality of patterns of verification PDUs are prepared, and checking is practiced a plurality of times, so as to make checking reliable.

In this step, when generating the verification PDU as described above, the matching verification part 128 generates a verification PDU by causing bit inversion or the like on the safety PDU after the non-safety layer 501 generates the black channel PDU, that is, after CRC checking data in the non-safety layer 501 is appropriately added to the safety PDU.

Hence, when generating the verification PDU as described above, the non-safety layer 501 provides the matching verification part 128 with a means for rewriting the PDU of the non-safety layer 501.

Characteristic of Embodiment 2

The safety communication device according to the present embodiment is provided with the matching verification part 128 which, upon reception of verification data (verification PDU), performs verification on the basis of the verification data, the verification data (PDU) being employed to verify whether or not a non-safety layer data check parameter, which is used by a threshold value setting part 127 when setting a request error rate, is actually used in a non-safety layer.

Description of Effect of Embodiment 2

As described above, according to the present embodiment, the matching verification part 128 verifies whether or not the parameter which the safety communication device holds as the parameter of the non-safety layer is the one that is actually used in the non-safety layer. Thus, safety can be guaranteed.

Other Embodiments

It is possible to combine the embodiments described above arbitrarily; to modify an arbitrary constituent element of each embodiment; or to omit an arbitrary constituent element of each embodiment.

The embodiments are not limited to those indicated in Embodiments 1 and 2, and various changes can be made to the embodiments as necessary.

REFERENCE SIGNS LIST

10: safety master; 20: safety slave; 101: CPU; 102: memory; 104: field communication interface; 105: bus; 120: safety master program; 121: safety application interface part; 122: safety PDU generation part; 123: safety PDU checking part; 124: safety monitoring control part; 125: safety layer parameter acquisition part; 126: non-safety layer parameter acquisition part; 127: threshold value setting part; 128: matching verification part; 201: CPU; 202: memory; 203: input/output interface; 204: field communication interface; 205: bus; 220: safety slave program; 221: safety application interface part; 222: safety PDU generation part; 223: safety PDU checking part; 224: safety monitoring control part; 225: threshold value management part; 226: matching verification part; 501: non-safety layer; 502: field network.

The invention claimed is:

1. A safety communication device having a safety layer to receive safety layer data from a non-safety layer that performs non-safety layer error detection of detecting a bit error included in non-safety layer data transmitted via a non-safety network which is not guaranteed as meeting safety property of data communication and which includes the non-safety layer, the non-safety layer converting the non-safety layer data into the safety layer data and forwarding the safety layer data to the safety layer when a bit error is not detected in the non-safety layer data, the safety communication device comprising:
processing circuitry, the processing circuitry:
to perform safety layer error detection of detecting a bit error included in the safety layer data;
to acquire a reception bit rate of the safety layer data being received per unit time, and a safety layer error detection characteristic which is information concerning a characteristic of the safety layer error detection;
to acquire a non-safety layer error detection characteristic which is information concerning a characteristic of the non-safety layer error detection;
to set a request error rate requested as an upper limit of a unit-time error detection number being a number of detected bit errors included in the safety layer data which is received per unit time, on a basis of:
a request value corresponding to a bit error rate being requested as an upper limit of an error occurrence probability per bit during data communication in the non-safety network;
the reception bit rate;
the safety layer error detection characteristic; and
the non-safety layer error detection characteristic; and to compare the unit-time error detection number with the request error rate, and to perform safety control on a basis of a comparison result.

2. The safety communication device according to claim 1, wherein the processing circuitry further:
acquires a safety layer data check parameter which is to be used for the safety layer error detection;
acquires a non-safety layer data check parameter which is to be used for the non-safety layer error detection; and
uses the non-safety layer data check parameter and the safety layer data check parameter when setting the request error rate.

3. The safety communication device according to claim 2, wherein when cyclic redundancy check is employed for checking the non-safety layer data and checking the safety layer data, the processing circuitry:
acquires a unit length determined by a transmission unit of the safety layer data, and as the safety layer data check parameter, a parameter of a generative polynomial of cyclic redundancy check which is employed for checking the safety layer data;
acquires a unit length of the non-safety layer data, and as the non-safety layer data check parameter, a parameter of a generative polynomial of cyclic redundancy check which is employed for checking the non-safety layer data;
finds a request value corresponding to an error-free probability which is a probability that the non-safety layer data is error free, on a basis of the request value corresponding to the bit error rate and the unit length of the non-safety layer data;
finds a request value corresponding to a detection error rate which is a proportion of a number of pieces of non-safety layer data detected as the non-safety layer data including a bit error, out of the non-safety layer data including a bit error in the non-safety layer, to a total number of pieces of non-safety layer data which is a total number of pieces of non-safety layer data that reaches the non-safety layer, on a basis of the request value corresponding to the error-free probability, the request value corresponding to the bit error rate, the unit length of the non-safety layer data, and the non-safety layer data check parameter;
finds a request value corresponding to a residual error rate which is a proportion of a number of pieces of safety layer data detected as safety layer data including a bit error, out of the safety layer data including a bit error in the safety layer, to the total number of pieces of non-safety layer data, on a basis of the request value corresponding to the bit error rate, the request value corresponding to the detection error rate, the unit length of the safety layer data, the safety layer data check parameter, the unit length of the non-safety layer data, and the non-safety layer data check parameter; and
defines the request error rate as a value obtained by multiplying the request value corresponding to the residual error rate by the reception bit rate.

4. The safety communication device according to claim 2, wherein the processing circuitry, upon reception of verification data, performs verification of whether or not the non-safety layer data check parameter is actually used in the non-safety layer, on a basis of the verification data, the verification data being employed to verify whether or not the non-safety layer data check parameter, which is used when setting the request error rate, is actually used in the non-safety layer.

5. The safety communication device according to claim 3, wherein the processing circuitry, upon reception of verification data, performs verification of whether or not the non-safety layer data check parameter is actually used in the non-safety layer, on a basis of the verification data, the verification data being employed to verify whether or not the non-safety layer data check parameter, which is used when setting the request error rate, is actually used in the non-safety layer.

6. A safety communication system comprising:
the safety communication device according to claim 1; and
the non-safety network.

7. A safety communication system comprising:
the safety communication device according to claim 2; and
the non-safety network.

8. A safety communication system comprising:
the safety communication device according to claim 3; and
the non-safety network.

9. A safety communication system comprising:
the safety communication device according to claim 4; and
the non-safety network.

10. A safety communication system comprising:
the safety communication device according to claim 5; and
the non-safety network.

11. A safety communication method by a safety communication device having a safety layer to receive safety layer data from a non-safety layer that performs non-safety layer error detection of detecting a bit error included in non-safety layer data transmitted via a non-safety network which is not guaranteed as meeting safety property of data communication and which includes the non-safety layer, the non-safety layer converting the non-safety layer data into the safety layer data and forwarding the safety layer data to the safety layer when a bit error is not detected in the non-safety layer data, the safety communication method comprising:
performing safety layer error detection of detecting a bit error included in the safety layer data;
acquiring a reception bit rate of the safety layer data being received per unit time, and a safety layer error detection characteristic which is information concerning a characteristic of the safety layer error detection;
acquiring a non-safety layer error detection characteristic which is information concerning a characteristic of the non-safety layer error detection;
setting a request error rate requested as an upper limit of a unit-time error detection number being a number of detected bit errors included in the safety layer data which is received per unit time, on a basis of:
a request value corresponding to a bit error rate being requested as an upper limit of an error occurrence probability per bit during data communication in the non-safety network; the reception bit rate;
the safety layer error detection characteristic;
and the non-safety layer error detection characteristic; and
comparing the unit-time error detection number with the request error rate, and performing safety control on a basis of a comparison result.

12. A non-transitory computer-readable medium storing a safety communication program for a safety communication device being a computer and having a safety layer to receive safety layer data from a non-safety layer that performs non-safety layer error detection of detecting a bit error included in non-safety layer data transmitted via a non-safety network which is not guaranteed as meeting safety property of data communication and which includes the non-safety layer, the non-safety layer converting the non-safety layer data into the safety layer data and forwarding the safety layer data to the safety layer when a bit error is not detected in the non-safety layer data, the safety communication program causing the safety communication device:
  to perform safety layer error detection of detecting a bit error included in the safety layer data;
  to acquire a reception bit rate of the safety layer data being received per unit time, and a safety layer error detection characteristic which is information concerning a characteristic of the safety layer error detection;
  to acquire a non-safety layer error detection characteristic which is information concerning a characteristic of the non-safety layer error detection;
  to set a request error rate requested as an upper limit of a unit-time error detection number being a number of detected bit errors included in the safety layer data which is received per unit time, on a basis of:
    a request value corresponding to a bit error rate being requested as an upper limit of an error occurrence probability per bit during data communication in the non-safety network;
    the reception bit rate;
    the safety layer error detection characteristic; and
    the non-safety layer error detection characteristic; and
  to compare the unit-time error detection number with the request error rate, and to perform safety control on a basis of a comparison result.

\* \* \* \* \*